US011853356B1

(12) United States Patent
Krishnaswamy

(10) Patent No.: US 11,853,356 B1
(45) Date of Patent: Dec. 26, 2023

(54) SYSTEM AND METHOD FOR GENERATING HIERARCHICAL MIND MAP AND INDEX TABLE

(71) Applicant: Lumos Information Services, LLC, Piscataway, NJ (US)

(72) Inventor: Mukunda Krishnaswamy, Princeton, NJ (US)

(73) Assignee: Lumos Information Services, LLC, Piscataway, NJ (US)

( * ) Notice: Subject to any disclaimer, the term of this patent is extended or adjusted under 35 U.S.C. 154(b) by 16 days.

(21) Appl. No.: 17/849,766

(22) Filed: Jun. 27, 2022

(51) Int. Cl.
| | |
|---|---|
| *G06F 16/71* | (2019.01) |
| *G11B 27/10* | (2006.01) |
| *G06V 10/74* | (2022.01) |
| *G06F 40/279* | (2020.01) |
| *G06F 16/74* | (2019.01) |
| *G06F 40/137* | (2020.01) |
| *G10L 15/26* | (2006.01) |
| *G10L 25/57* | (2013.01) |
| *G06F 40/177* | (2020.01) |

(52) U.S. Cl.
CPC .............. *G06F 16/71* (2019.01); *G06F 16/74* (2019.01); *G06F 40/137* (2020.01); *G06F 40/177* (2020.01); *G06F 40/279* (2020.01); *G06V 10/761* (2022.01); *G10L 15/26* (2013.01); *G10L 25/57* (2013.01); *G11B 27/10* (2013.01)

(58) Field of Classification Search
CPC ........ G06F 16/71; G06F 16/74; G06F 40/137; G06F 40/177; G06F 40/279; G06V 10/761; G10L 15/26; G10L 25/57; G11B 27/10
See application file for complete search history.

(56) References Cited

U.S. PATENT DOCUMENTS

| | | |
|---|---|---|
| 6,961,954 B1 | 11/2005 | Maybury et al. |
| 7,184,959 B2 | 2/2007 | Gibbon et al. |
| 9,892,194 B2 | 2/2018 | Wang et al. |
| 10,127,824 B2 | 11/2018 | Yadav et al. |
| 10,509,825 B2 | 12/2019 | Bhatt et al. |
| 11,023,523 B2 | 6/2021 | Hauptmann et al. |
| 2019/0196675 A1* | 6/2019 | German ................. G06V 30/40 |
| 2021/0065569 A1* | 3/2021 | Arvindam ............... G06F 40/30 |
| 2022/0036754 A1* | 2/2022 | Le Chevalier ........ A63F 13/825 |
| 2022/0208016 A1* | 6/2022 | Le Chevalier ...... H04L 12/1827 |

FOREIGN PATENT DOCUMENTS

JP        2020521246        7/2020

OTHER PUBLICATIONS

Anusha Vimalaksha et al., NPL ("Hierarchical Mind Map Generation from Video Lectures" 2019 IEEE—pp. 110-113 (Year: 2019).*

* cited by examiner

*Primary Examiner* — Quoc A Tran

(57) ABSTRACT

This invention relates to a System and Method for generating Primary Output and a Secondary Output programmatically. The method may include extracting a transcript, topics, a hierarchy of the topics of a video file, and generating a Primary Output and a Secondary Output programmatically. The Primary Output comprises a visual, editable, clickable, and hierarchical Mind map for the video file. It further comprises a Unique address of parent and child nodes in the hierarchical Mind map and Time-stamps of corresponding topics. The Secondary Output comprises an index table of a Proximity score, details on whether a Secondary Input is found or not in the video file, a Unique address P[u,m,n], From and To Time-stamps, and a corresponding topic in the video file.

12 Claims, 13 Drawing Sheets

Overall System

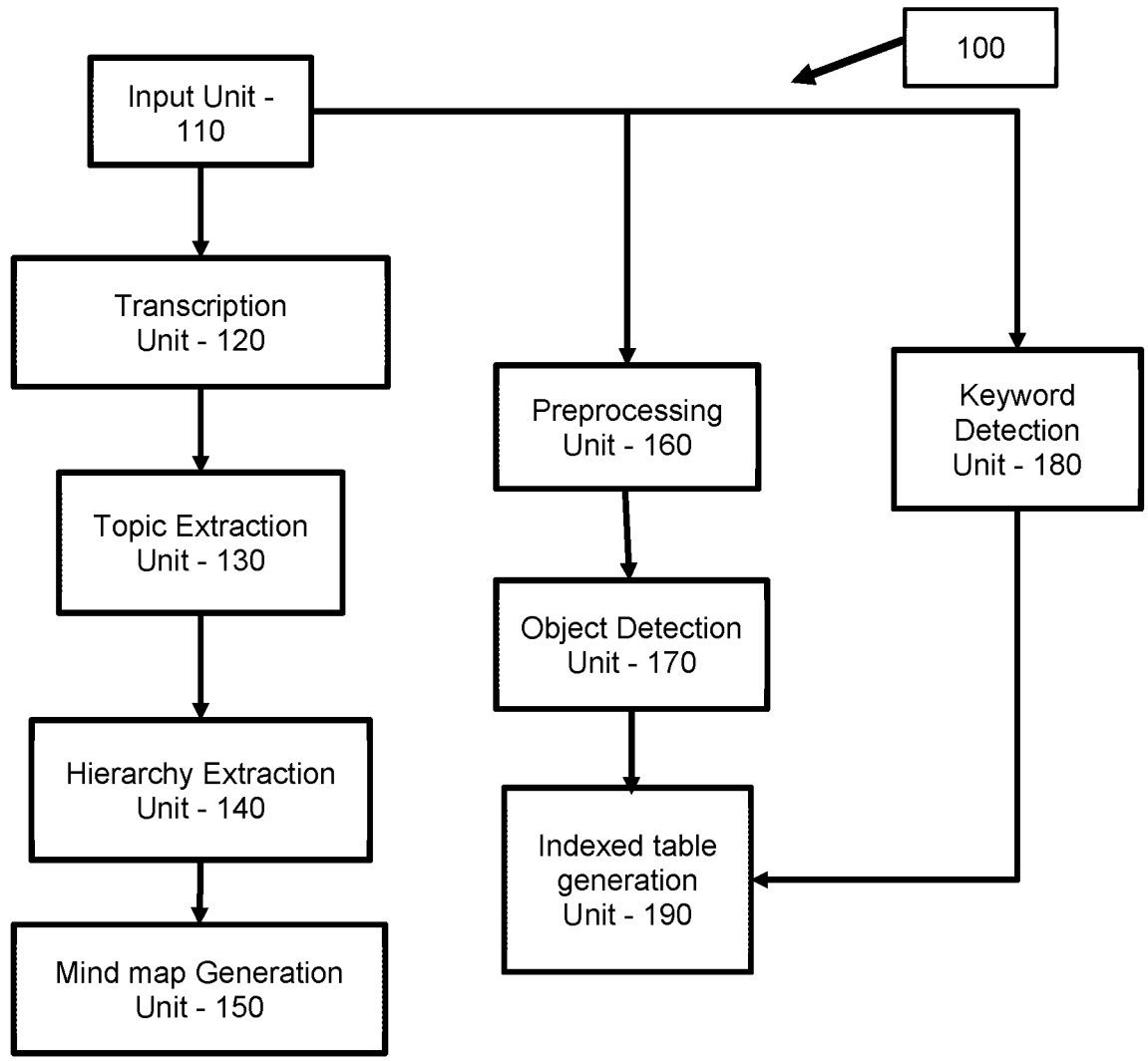
Fig. 1 - Overall System

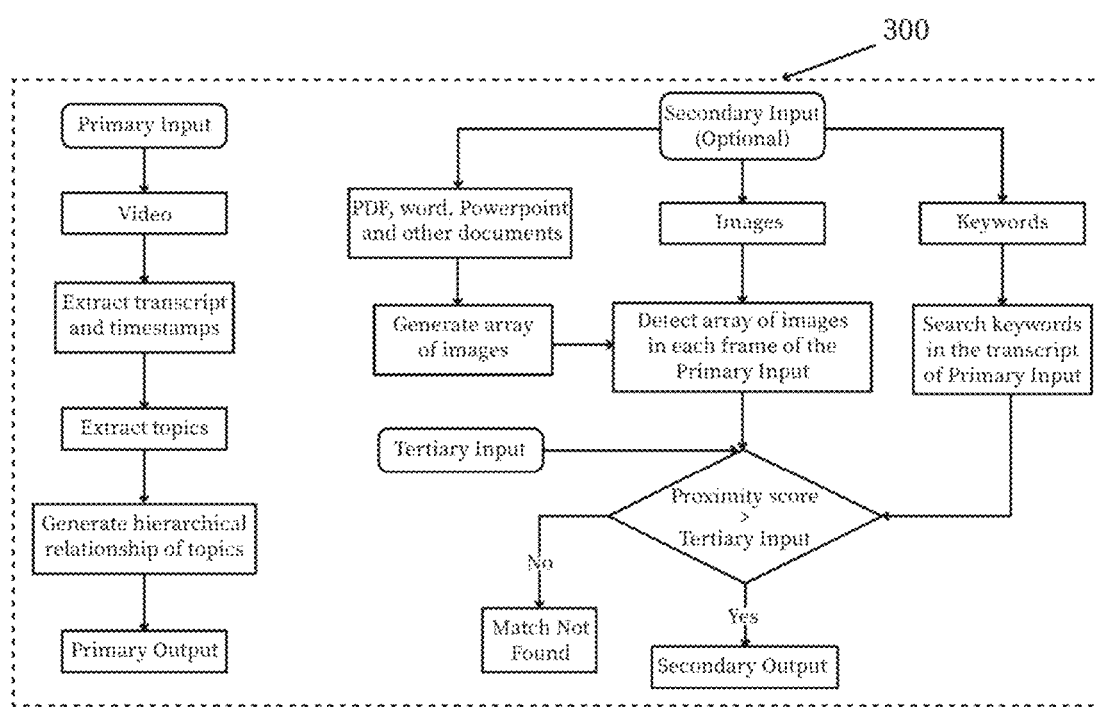
Fig. 2 - Overall Method

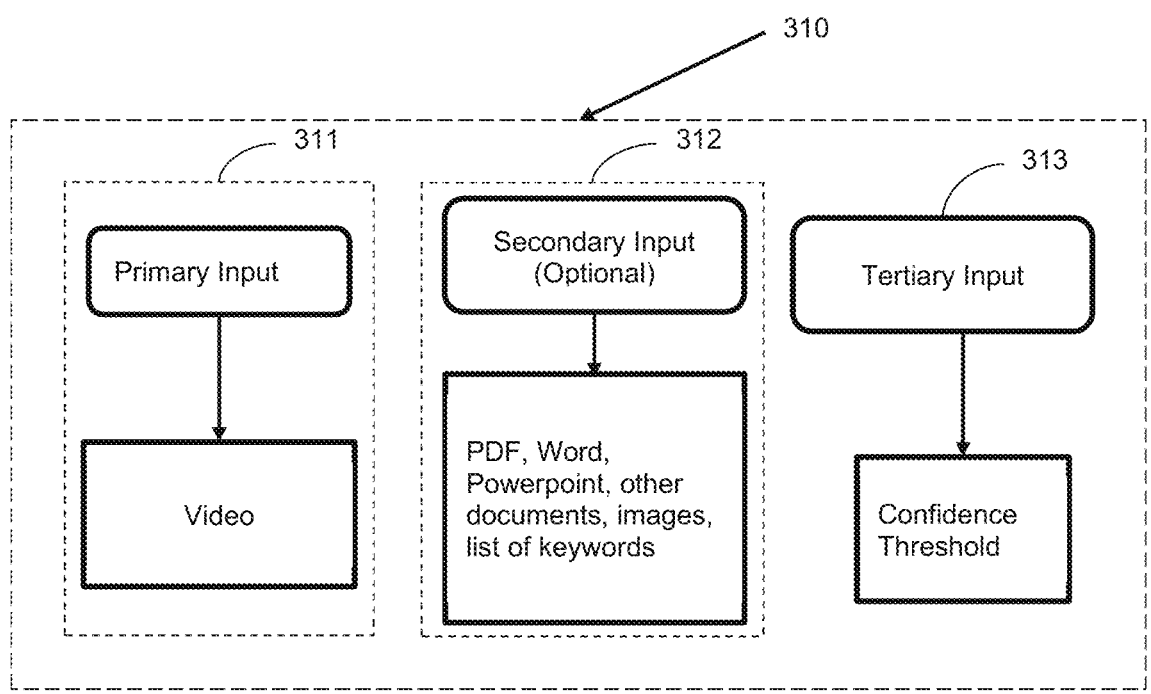
Fig. 2A - Input Step

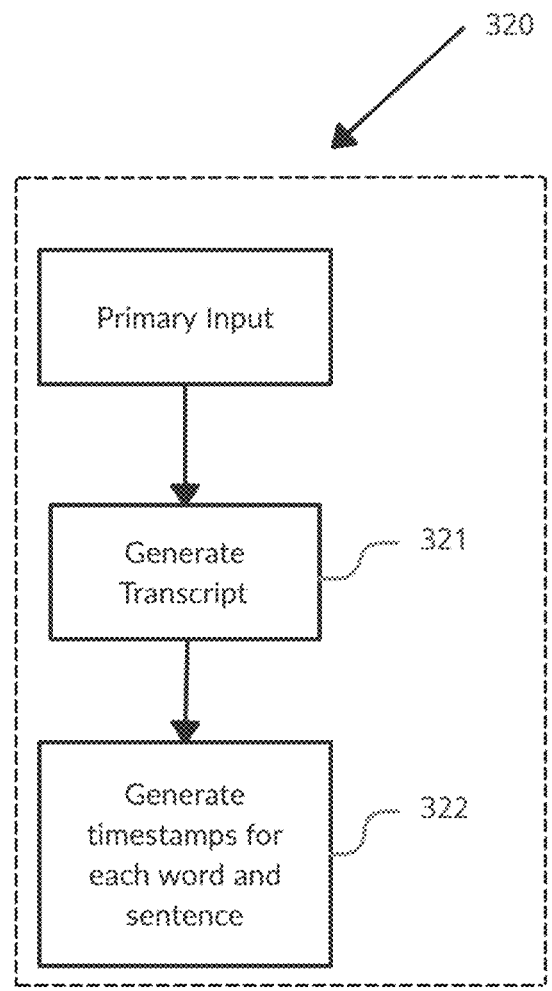
Fig. 2B - Transcription Step

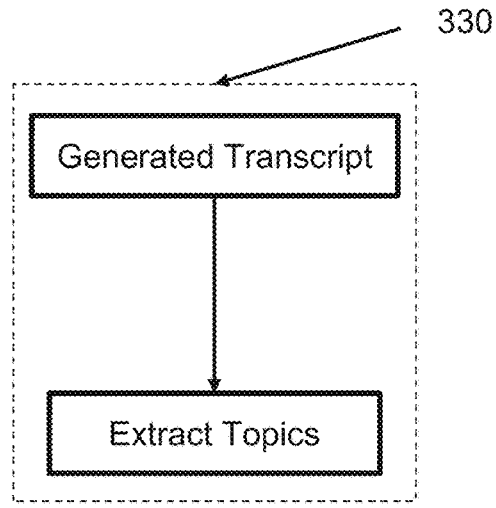
Fig. 2C - Topic Extraction Step
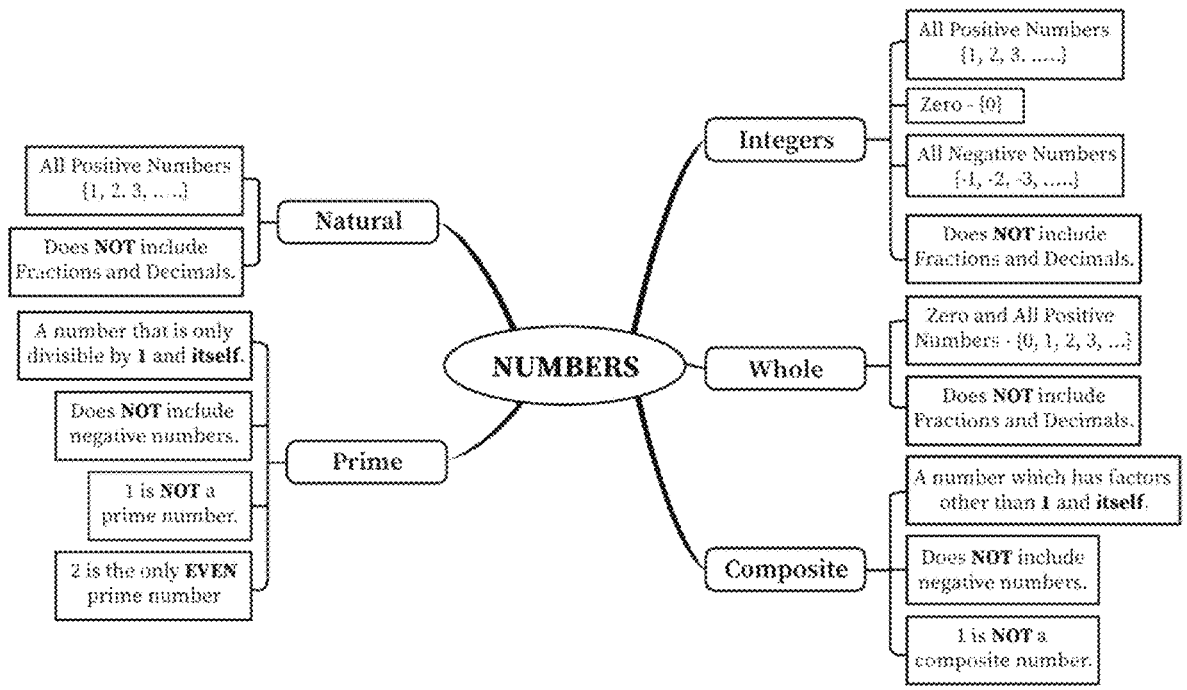
Fig. 2C.1 - Topic Extraction Step

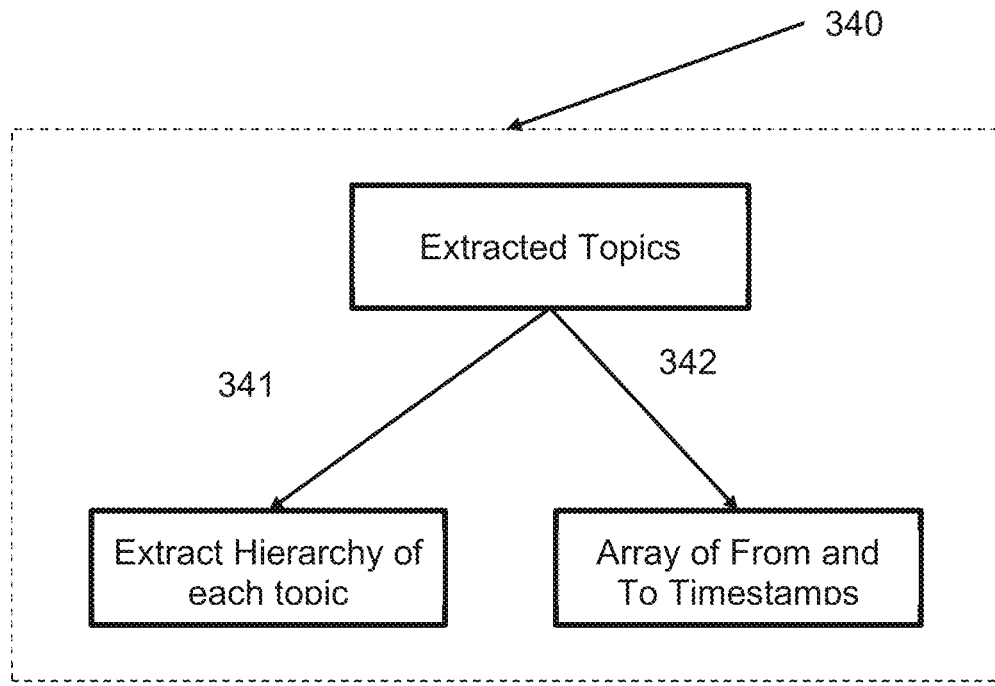
Fig. 2D - Hierarchy Extraction Step
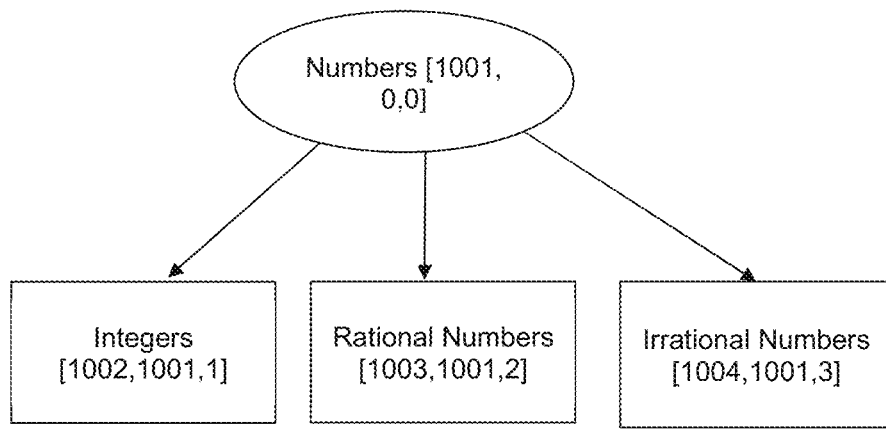
Fig. 2D.1 - Unique Address Representation

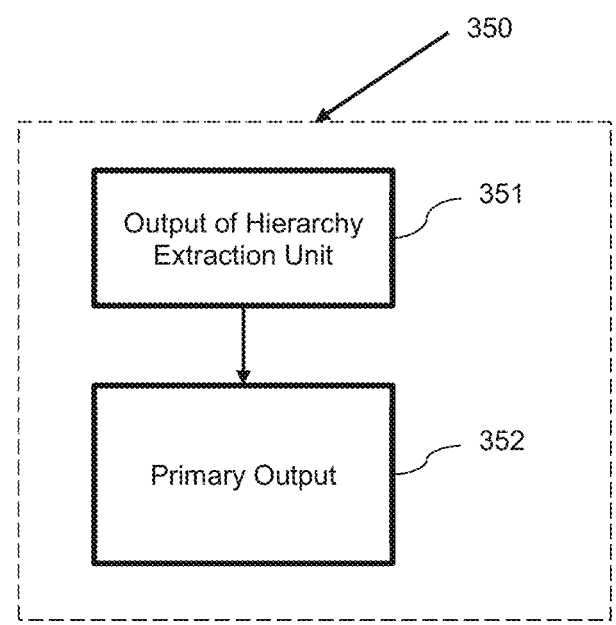
Fig. 2E – Mind map Generation Step

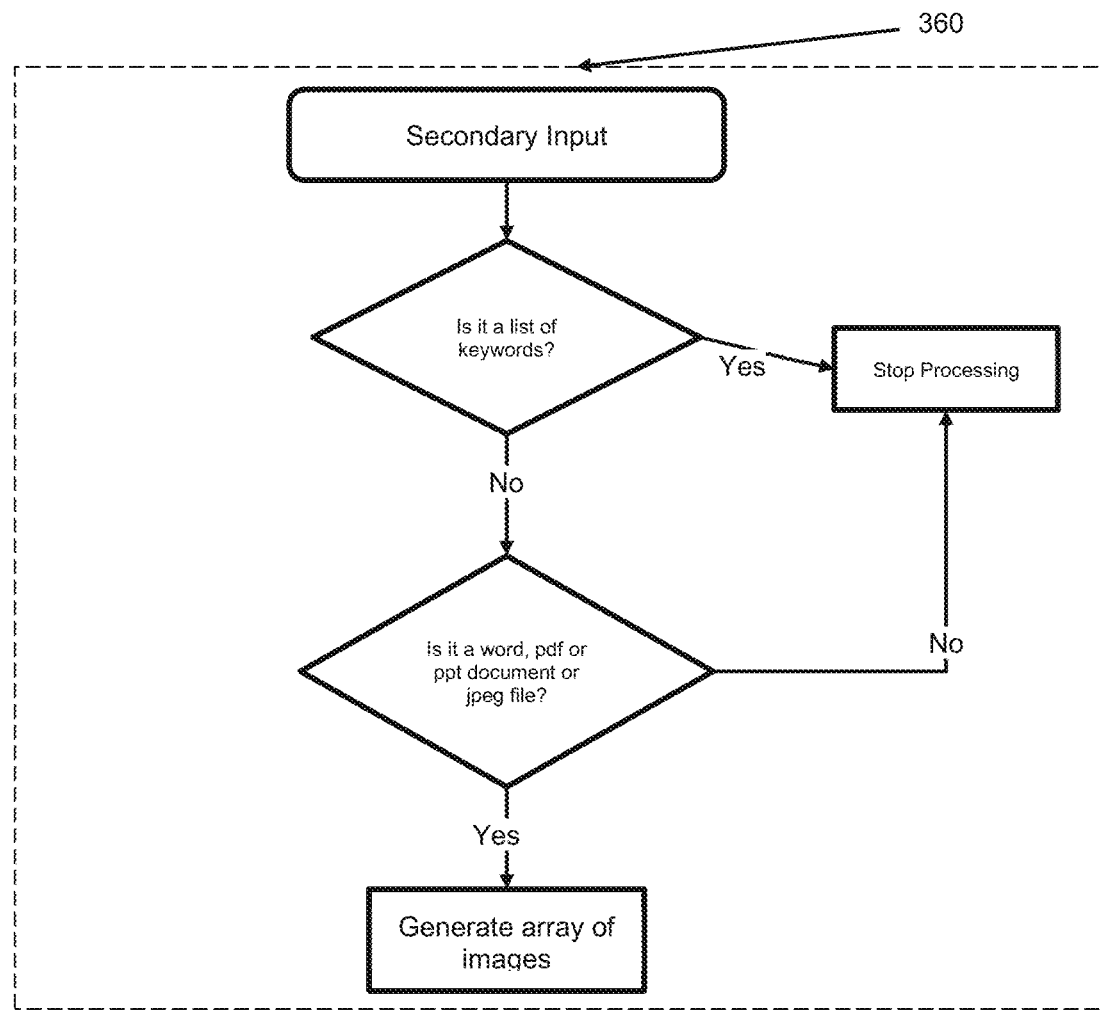
Fig. 2F - Pre-processing Step

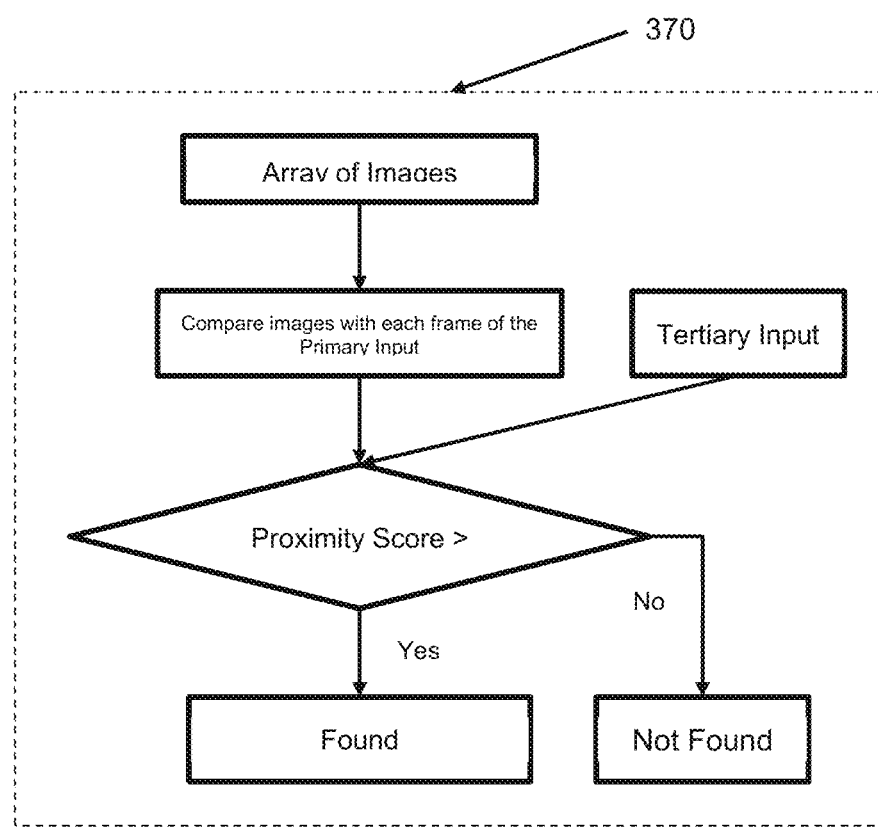
Fig. 2G - Object Detection Step

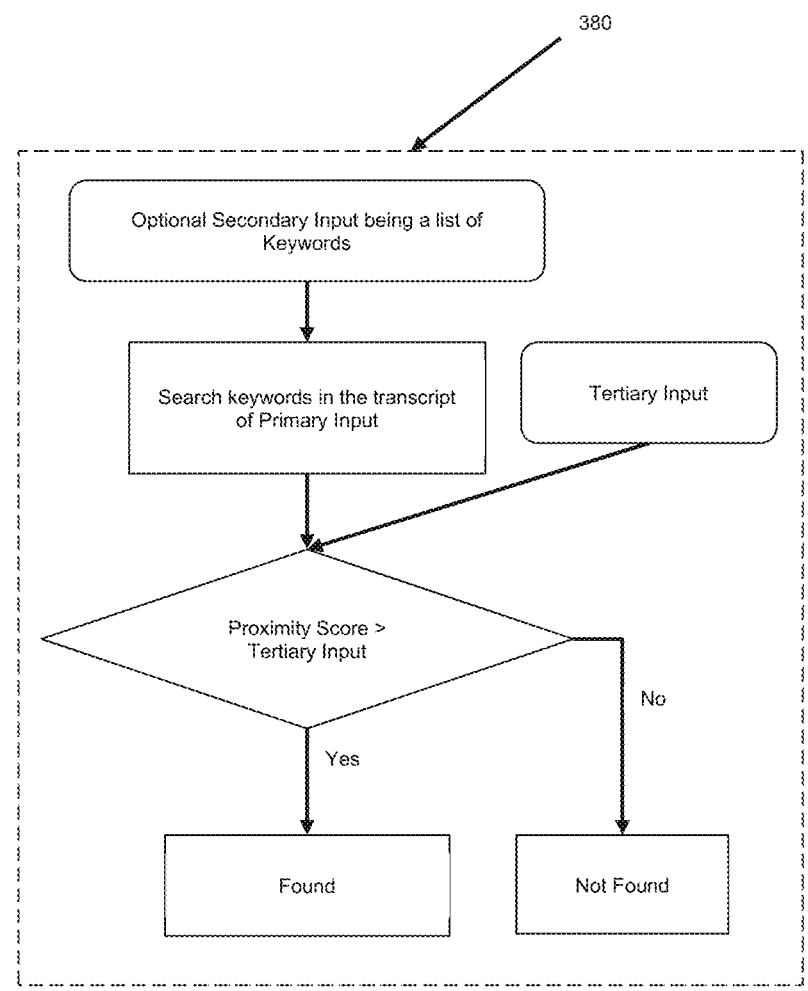
Fig. 2H - Keyword Detection Step

Secondary Output

| Secondary Input(j) | Proximity score | Match | P[u,m,n] | Time (From) | Time (To) | Topic |
|---|---|---|---|---|---|---|
| Keyword Number System | 90 | Yes | 1001,0,0 | 0 | 5.45 | Number System |
| Keyword Integers | 90 | Yes | 1002,1001,1 | 0.01 | 3.00 | Integers |
| Image of a baseball | 20 | No | | | | |
| Image of Arabic civilization | 85 | Yes | 1003,1001,2 | 3.00 | 5.45 | Whole Numbers |
| Keyword Integers | 92 | Yes | 1002,1001,1 | 0.01 | 3.00 | Integers |
| Keyword Number System | 85 | Yes | 1001,0,0 | 0 | 5.45 | Number System |
| numbersystem .pdf[1] | 92 | Yes | 1004,1002,1 | 1.25 | 1.45 | All Positive Numbers |
| numbersystem .pdf[20] | 50 | No | | | | |

Fig. 3

SYSTEM AND METHOD FOR GENERATING HIERARCHICAL MIND MAP AND INDEX TABLE

TECHNICAL FIELD OF INVENTION

The invention relates to programmatically generating a hierarchical Mind map for a video file. It further represents the relationship between the contents of the video file and contents of supporting files, though not limited to, such as a PDF document, a Word document, a Jpeg file, a Powerpoint presentation, or a list of keywords that may appear in that video file, in the form of an index table.

BACKGROUND OF THE INVENTION

In a typical printed book, we see a table of contents at the beginning that lists the various chapters, subchapters, and page numbers for readers' benefit. The reader can look into the topic of their interest and go to the exact page number where it is found. Chapterization and indexing are done manually. In the case of an online video lecture containing various chapters and subchapters, technologies are now available to show a dynamic table of contents. However, the table of contents is not displayed hierarchically as a Mind map with clickable hyperlinks to redirect a user to the video lecture. The representation of such video content is linear. Linear searching of such content and its manual indexing are cumbersome. Such manual intervention brings down the efficacy of the knowledge assimilation by users. Further, technologies are available that primarily deal with the following:
- providing a video summary
- linear representation of topics
- coherently or logically transition between multiple series
- tagging metadata related to news stories and other types of information
- broad level classification of the News story
- search engine that allows users to search for semantic features in an audio-visual document However, most of these technologies fail to address the hierarchical representation of the contents of a video file as an interactive Mind map. These technologies do not let a user know whether a particular page of a PDF or a word document is used by the speaker in a video or not; if it is used, at what point in time it is used, and the corresponding topic. Similarly, there are no technologies that allow a user to run a keyword or an image search and give search results with useful information such as the proximity of the match, the time stamp, the corresponding topic in which the match is found, and so on. In other words, the available technologies do not establish the relationship between the contents of a video and with contents of supporting files such as a PDF document, a Word document, a Jpeg file, a Powerpoint presentation, or a list of keywords. It does not provide a confidence score for any plausible match based on the user's preferences. Further, these technologies do not allow users to edit the Transcription or the topics extracted from that video file. Furthermore, these technologies do not provide Time-stamps of the contents of the video files and the other files referenced in that video.

Thus, most of the available technologies relate to search optimization and content curation of a video file in bits and pieces. There is an evident need for systems and methods to overcome the shortcomings in the available technologies prior arts.

OBJECTIVE OF INVENTION

The objective of the invention is to programmatically generate a hierarchical Mind map for a video file, though not limited to, and to represent the relationship between the contents of that video file and contents of supporting files, though not limited to, such as a PDF document, a Word document, a Jpeg file, a Powerpoint presentation or a list of keywords that may appear in that video file, in the form of an index table.

SUMMARY OF INVENTION AND DEFINITIONS

Embodiments of the present invention exist as a System and Method for programmatically generating a hierarchical Mind map for a video file and to represent the relationship between the contents of that video file and contents of supporting files, such as but not limited to a PDF document, a Word document, a Jpeg file, a Powerpoint presentation or a list of keywords, that may appear in that video file, in the form of an index table. Mind map relates to the hierarchical representation of the video file contents and their Time-stamps. A Mind map consists of a parent node with one or more child nodes. Each child node can further have one or more child nodes.

The system includes an Input Unit, a Transcription Unit, a Topic Extraction Unit, a Hierarchy Extraction Unit, a Mind map Generation Unit, Pre-processing Unit, an Object Detection Unit, a Keyword Detection Unit, and an Index table generation Unit.

The Input Unit receives a Primary Input, an optional Secondary Input, and a Tertiary Input. The Primary Input may be a video file. A video file relates to a moving image, including a computer file in video formats such as MP4, MOV, M4V, AVI, DivX, or FLV. The Secondary Input may be one or more pages of a PDF document or a Word document, or one or more slides of a Powerpoint presentation, or one or more image files such as a Jpeg file, or a list of keywords. The Tertiary Input is the Confidence Threshold as entered by a user. Confidence Threshold is a marker entered by the user. The marker ranges from 0 to 1. The Confidence Threshold indicates how close the Secondary Input matches with the Primary Input. 0 implies farthest from a match, and 1 implies the closest match.

The Transcription Unit extracts a transcript of the Primary Input and Time-stamps of each word in that transcript. The user can edit the extracted transcript. The time-stamp relates to the beginning and the end time of a word in the transcript of that Primary Input.

The Topic Extraction Unit extracts the topics based on the Output of the Transcription Unit. Such extracted topics are editable. A topic relates to a subject matter of Primary Input.

The Hierarchy Extraction Unit generates a hierarchical representation of the extracted topics based on the conceptual relationship found among the topics within the context of the Primary Input. Further, it returns the time-stamp for each topic in the hierarchy.

A hierarchy relates to the multi-nodal representation of various topics via parent-child relationships. A most common type of hierarchy in computing is a file system, in which computer files are placed in a hierarchical tree structure. File systems have a top-level root referred to as the file system's root. Under the root are subdirectories such as "Program Files," "Documents and Settings." Under these subdirectories are more subdirectories.

Similarly, a video lecture could have several related topics, with the main topic represented in a central parent node. Moreover, multiple child nodes could be connected to the main topic, and each topic could have a rank or position relative to other sibling nodes. In this invention, a Unique address, P[u,m,n], is assigned to each node in the hierarchy. In P[u,m,n], 'u' represents a unique number for each node in the system. 'm' represents the number of its parent node; and 'n' represents its position relative to the siblings of a node.

The Mind map Generation Unit programmatically generates a Primary Output based on the Output of the Hierarchy Extraction Unit. Primary Output comprises a hierarchical Mind map of topics, a Unique address P[u,m,n], a From and To Time-stamps of that topic. The Mind map is editable and clickable. It has an array of links that redirects to a specific topic every time it appears in the Primary Input. Mind map relates to the hierarchical representation of the video file contents and their Time-stamps. A Mind map consists of a parent node with one or more child nodes. Each child node can further have zero or one or more child nodes.

The Pre-processing Unit creates an array of images of the Secondary Input. The Secondary input may be one or more pages of a PDF document or a Word document, or one or more slides of a Powerpoint presentation, or one or more image files such as a Jpeg file, or a list of keywords. If the Pre-processing Unit receives a Secondary Input being a PDF document or a Word document, or one or more slides of a Powerpoint presentation, or one or more image files such as a Jpeg file, the Pre-processing Unit processes such documents, slides, and images to create an array of images. Further, if the Pre-processing Unit receives a Secondary Input, being a list of keywords, it stops processing and does not create any image.

The Object Detection Unit receives an array of images from the Pre-processing Unit. It attempts to compare the Input image with each frame of the Primary Input. A Proximity score is generated programmatically for each pair of images, which is examined by the Object Detection Unit. A match is said to be found if the Proximity score is more than or equal to the Tertiary Input. A match is not found if the Proximity score is less than the Tertiary Input. Object relates to an identifiable portion of the image detected in each frame of the Primary Input. Proximity score shows how close an object in the Secondary Input matches an object in the Primary Input. It ranges from 0 to 1.0 implies the object is farthest from a match, and 1 implies closest to the match. The pair of images relates to the image created by the Pre-processing Unit and the frame of the Primary Input. Frame relates to one of the many still images which compose the complete moving picture.

In the case of the Secondary Input being a list of keywords, the Keyword Detection Unit searches a given keyword in the transcript of the Primary Input based on string search. A Proximity score is generated programmatically for every keyword examined by the Keyword Detection Unit. A match is said to be found if the Proximity score is more than or equal to the Tertiary Input. A match is not found if the Proximity score is less than the Tertiary Input. Keyword relates to the words found in the Transcription of the Primary Input.

The Index table generation Unit generates a Secondary Output in the form of an index table. Each line item in the index table comprises a Secondary Input[j], the Proximity score, a Match, the Unique address P[u,m,n], the From and To Time-stamps for each occurrence of that Secondary Input in the Primary Input and the corresponding topic. If the match is not found, it returns a "No" flag. For example, the Primary Input for this Unit is a video file. Secondary Input comprises one or more pages of a PDF document or a Word document, or one or more slides of a Powerpoint presentation, or one or more image files such as a Jpeg file, or a list of keywords. In Secondary Input[j], j refers to an index of Secondary Input. For example, if Secondary Input is a PDF document having 17 pages, j refers to the page number index and will have values ranging from 0 to 16. P[u,m,n] is a Unique address assigned to each node in the hierarchy. In P[u,m,n], 'u' represents a unique number for each node in the system, m represents the number of its parent node and n represents its position relative to the siblings of a node.

BRIEF DESCRIPTION OF DRAWINGS

FIG. 1 shows a block diagram of a system for programmatically generating a hierarchical Mind map for a video file. It further represents the relationship between the contents of that video file and contents of supporting files such as a PDF document, a Word document, a Jpeg file, a Powerpoint presentation, or a list of keywords, though not limited to, that may appear in that video file, in the form of an index table.

FIG. 2 shows a flowchart of a method 300, for programmatically generating a hierarchical Mind map for a video file. It further represents the relationship between the contents of that video file and contents of supporting files such as a PDF document, a Word document, a Jpeg file, a Powerpoint presentation, or a list of keywords, though not limited to, that may appear in that video file, in the form of an index table.

FIG. 2A shows a flowchart of a method 310, for receiving plurality of Inputs, such as a Primary Input, an optional Secondary Input, and a Tertiary Input, using an Input Unit, 110. The Primary Input may be a video file. The optional Secondary Input may be a PDF document, a Word document, a Jpeg file, a Powerpoint presentation, or a list of keywords. The Tertiary Input is the Confidence Threshold as entered by a User.

FIG. 2B shows a flowchart of a method 310, for generating the transcript from Primary Input using a Transcription Unit, 120.

FIG. 2C and FIG. 2C.1 show a flowchart of a method 330, for extracting a list of topics based on the Output of the Transcription Unit using a Topic Extraction Unit, 130.

FIG. 2D shows a flowchart of a method 340, for hierarchical representation of the extracted topics based on the conceptual relationship, found among the topics within the context of the Primary Input using a Hierarchy Extraction Unit, 140. Further, it returns the time-stamp for each topic in the hierarchy. FIG. 2D.1 shows a diagrammatic representation of how the nomenclature of Unique address, P[u,m,n], is used.

FIG. 2E shows a flowchart of a method 350, for programmatically generating a Primary Output based on the Output of the Hierarchy Extraction Unit. Primary Output comprises a hierarchical Mind map of topics, Unique address P[u,m,n], From and To Time-stamps of that topic, using a Mind map Generation Unit, 150. The Mind map is editable. Further, the Mind map is clickable with an array of links to redirect to a topic for each occurrence of that topic in the Primary Input.

FIG. 2F shows a flowchart of a method 360, for creating an array of images for a Secondary Input, using a Pre-processing Unit, 160.

FIG. 2G shows a flowchart of a method 370, for comparing and detecting an Input image within each frame of the Primary Input using an Object Detection Unit, 170.

FIG. 2H shows a flowchart of a method 380, for searching a keyword in the transcript of a video file using a Keyword Detection Unit, 180.

FIG. 3 shows the Secondary Output in the form of an index table, using an Index table generation Unit, 190. The Secondary Output comprises Secondary Input[j], the Proximity score, Match, Unique address P[u,m,n], From and To Time-stamps for each occurrence of that Secondary Input in the Primary Input, the corresponding topic.

Figure 4:
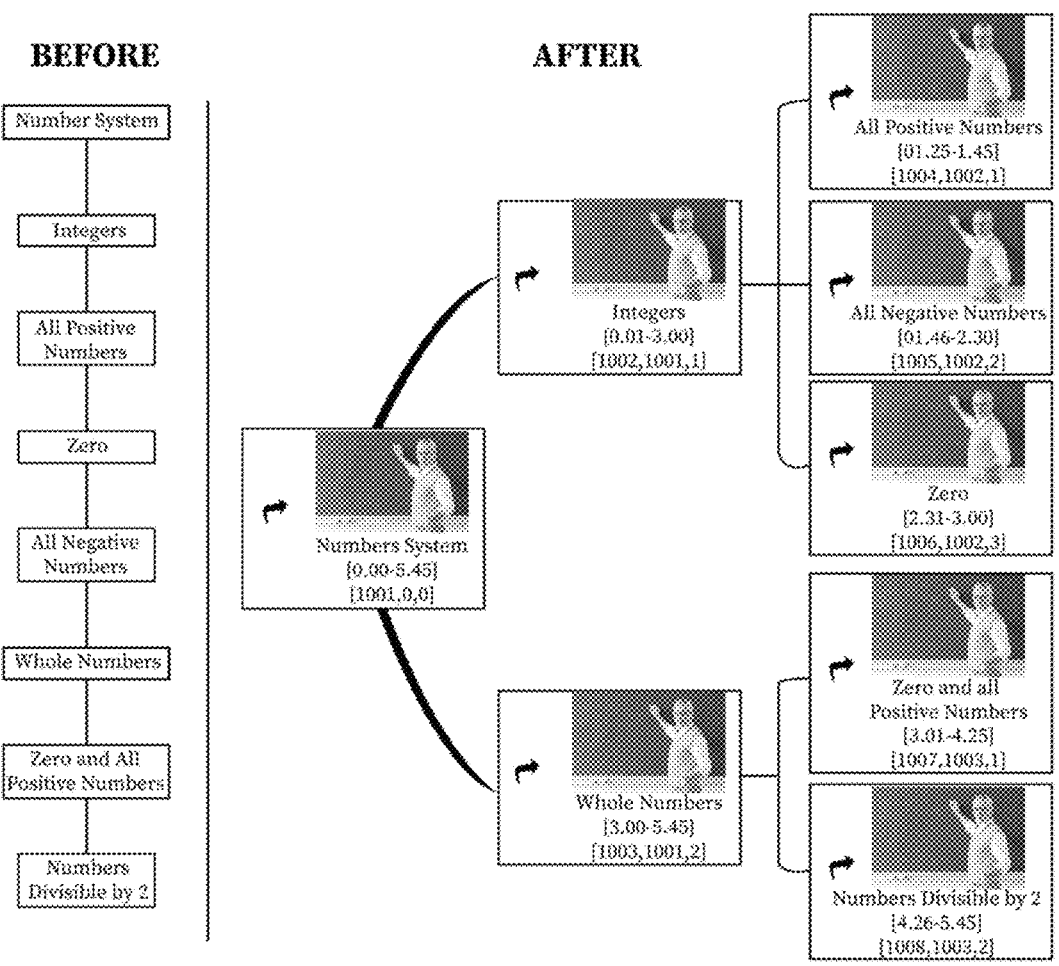
FIG. 4 shows the screenshot of the representation of contents of a video file before and after the invention.
Figure 5:
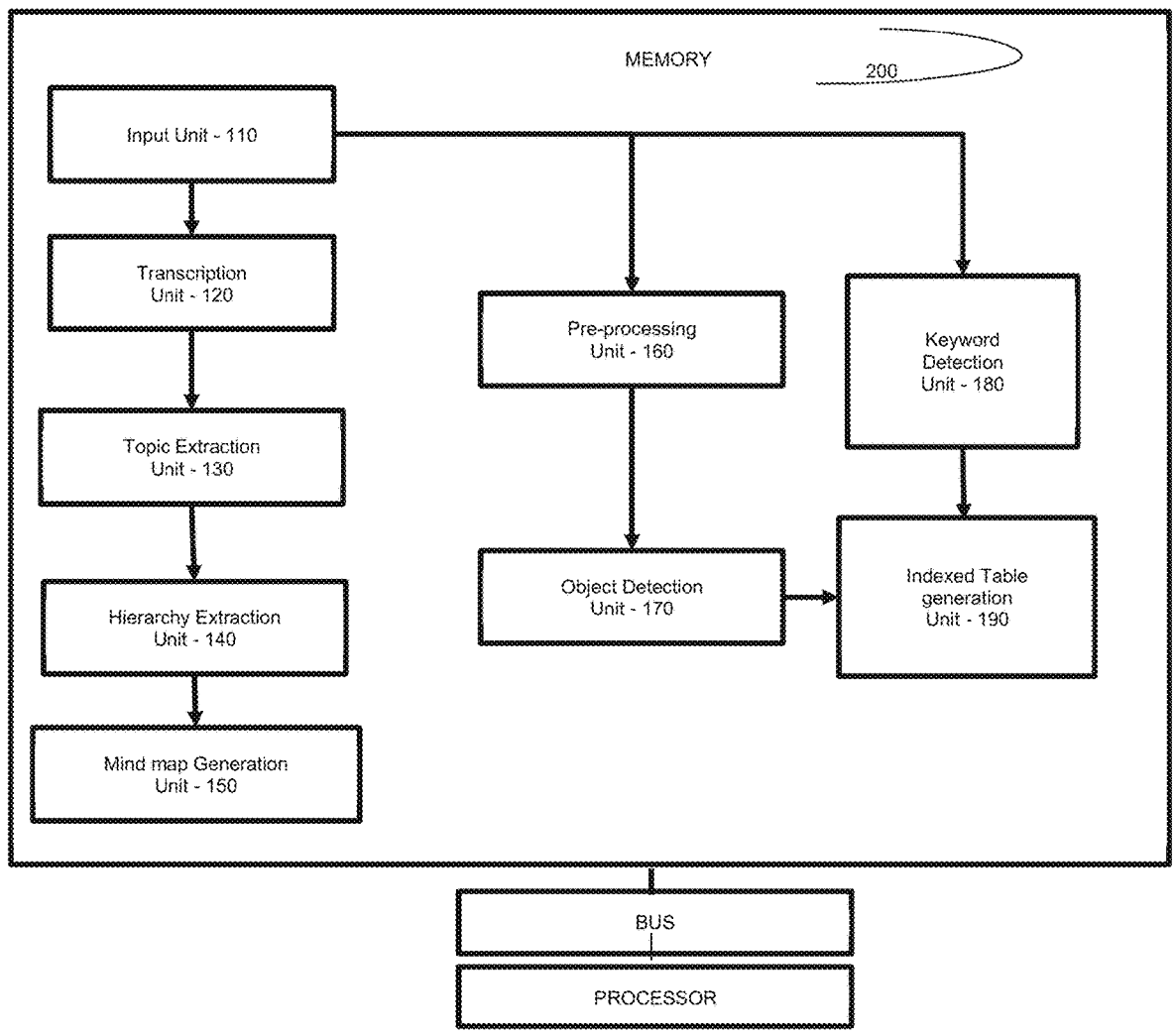
FIG. 5 shows a block diagram of a computer or a server in accordance with an embodiment of the present disclosure.

The figures depict embodiments of the disclosure for purposes of illustration only. One skilled in the art will readily recognize from the following description that alternative embodiments illustrated herein may be employed without departing from the principles of the disclosure described herein.

DETAILED DESCRIPTION

The description provided herein describes example embodiments of the present invention and is not intended to limit the invention to any particular embodiments or combination of embodiments. The drawings provided herein are for the purpose of example and are not intended to limit the invention to any particular embodiment or combination of embodiment. The embodiments are described herein for illustrative purposes and are subject to many variations. It is understood that various omissions and substitutions of equivalents are contemplated as circumstances may suggest or render expedient but are intended to cover the application or implementation without departing from the spirit or scope of the present invention. Furthermore, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity but rather denote the presence of at least one of the referenced items.

The terms "comprises," "comprising," or any other variations thereof are intended to cover a non-exclusive inclusion, such that a process or method that comprises a list of steps does not include only those steps but may include other steps not expressly listed or inherent to such a process or method. Similarly, one or more sub-systems or elements or structures or components preceded by "comprises . . . a" does not, without more constraints, preclude the existence of other sub-systems, elements, structures, components, additional sub-systems, additional elements, additional structures, or additional components. Appearances of the phrase "in an embodiment," "in another embodiment," and similar language throughout this specification may, but not necessarily do, all refer to the same embodiment.

The invention relates to programmatically generating a hierarchical Mind map for a video file. It further represents the relationship between the contents of that video file and contents of supporting files, though not limited to, such as a PDF document, a Word document, a Jpeg file, a Powerpoint presentation, or a list of keywords that may appear in that video file, in the form of an index table.

Detailed Description of System

FIG. 1 shows a schematic diagram of a System 100 for providing a Primary Output and a Secondary Output.

The System 100 includes an Input Unit 110 to receive a plurality of Inputs. The plurality of Inputs comprises a Primary Input, an optional Secondary Input, and a Tertiary Input. According to some embodiments, a Primary Input may be a video file. According to some embodiments, Secondary Input may be one or more pages of a PDF document or a Word document, or one or more slides of a Powerpoint presentation, or one or more image files such as a Jpeg file, or a list of keywords. According to some other embodiments, the Tertiary Input is the Confidence Threshold set by the user.

The System 100 includes a Transcription Unit 120 that extracts a transcript of the Primary Input. The Transcription is extracted using a Transcription software or a Speech-to-text Algorithm. Speech-to-text is the ability of a machine or Computer program to identify words spoken aloud and convert them into readable text programmatically. Speech recognition uses a broad array of research in computer science, linguistics, and computer engineering. Many modern devices and text-focused programs have speech recognition functions in them to allow for easier or hands-free use of a device. The transcript that is extracted is editable.

According to some embodiments of the System, the Transcription Unit returns the Time-stamps of each word. This embodiment is beneficial because it helps the user identify when the Transcription contents appear in the video file. Furthermore, Transcription is extracted by a Transcription API already available in the public domain. Transcription means the act of Transcription from spoken word to text. A Transcription API is an Application Programming Interface that enables developers to enhance their own applications with Transcription services. It is incredibly important for ease of communication, summarizing speech intent, deciphering languages accents, and clarifying speech dialects, and perhaps most importantly, providing accessibility to those with hearing disabilities.

The System 100 includes a Topic Extraction Unit 130 that extracts the topics based on the Output of the Transcription Unit. The extracted topics are editable.

The System 100 includes a Hierarchy Extraction Unit 140 that generates a hierarchical representation of the extracted topics based on the conceptual relationship found among the topics within the context of the Primary Input.

According to some embodiments of the System, the Hierarchy Extraction Unit also returns Time-stamps of each topic. Technology for extracting hierarchy is already available using topic modeling tools such as BigARTM. BigARTM is a tool based on a novel technique called Additive Regularization of Topic Models. This technique effectively builds multi-objective models by adding the weighted sums of regularizers to the optimization criterion.

The System 100 includes a Mind map Generation Unit 150. The Mind map Generation Unit 150 programmatically generates a Primary Output based on the Output of the Hierarchy Extraction Unit. Primary Output comprises a hierarchical Mind map of topics, a Unique address P[u,m,n], a From and To Time-stamps of that topic. The Mind map Generation Unit 150 traverses over the hierarchy of topics generated by the Hierarchy Extraction Unit 140, creating a bubble for each node and drawing a line between the parent node and the child node in the Mind map. Nodes are shapes, often containing text, that represents pieces of information in a Mind map. Compared with normal note-taking or brain-storming, Mind maps have several advantages. For instance, time is saved by just noting down relevant keywords. Associations between key points are highlighted while passively creating a hierarchy of ideas. Reviewing a Mind map takes considerably less time than a review of written notes as the Mind map is effective in displaying the relevant keywords associated with a particular topic. By providing a visually stimulating environment, the retention of information by the brain is made easier. There are several computer applications for Mind mapping. However, they do not have the capability to generate hierarchical Mind maps programmatically.

Further, the Mind map generated by the Mind map Generation Unit, 150 is editable. Furthermore, the Mind map generated is also clickable. It has an array of links to redirect the user to a specific topic for each occurrence of that topic in the Primary Input.

The working of the Mind map Generation Unit can be illustrated with an example. Consider a video file as a Primary Input on the topic "Numbers." The topic "Numbers" may have other sub-topics such as "Integers," and if the sub-topic "Integers" has additional sub-topics such as "Positive Integer," "Negative Integer," "Zero," and so on. The Mind map Generation Unit displays the main topic, "Numbers," in the form of thumbnails of topics and sub-topics spoken at different instances in that video, along with Time-stamps and Unique addresses for the main topic and subtopics within that video file. Each node in the Mind map is clickable, which will navigate the user to the part of the video where it was explained. Each node in the Mind map may have an array of clickable links that redirects a user to the specific part of the Primary Input based on the occurrence of those topics and sub-topics within that Primary Input.

According to some embodiments, the Mind map that is generated is editable. This embodiment is beneficial because it provides a visual arrangement of the contents of the video hierarchically. Furthermore, it provides an array of clickable links to revert to a specific topic of that video for each occurrence of that topic in that video.

The System 100 includes a Pre-processing Unit 160 that creates an array of images of a Secondary Input. According to some embodiments, Pre-processing Unit receives a Secondary Input being a PDF document or a Word document, or one or more slides of a Powerpoint presentation, or one or more image files such as a Jpeg file. The Pre-processing Unit processes the documents, slides, and images to create an array of images and passes it to the Object Detection Unit. According to some embodiments, the Pre-processing Unit receives a Secondary Input, being a list of keywords. It stops processing such list of keywords any further and does not create any image for the same. For example, suppose the speaker uses a particular document or a Powerpoint presentation as an aid to explain a specific topic and does not read verbatim the contents of that page or slide in the video. In that case, this unit helps to create images of such contents and passes them on to the Object Detection Unit. This embodiment is beneficial because it helps convert documents such as a PDF or a Word document, or a slide within a Powerpoint presentation, to an image file.

The System 100 includes an Object Detection Unit 170 that receives an array of images from the Pre-processing Unit. It attempts to compare the Input image with each frame of the Primary Input. A Proximity score is generated programmatically for each pair of images examined by the Object Detection Unit. A match is said to be found if the Proximity score is more than or equal to the Tertiary Input. Further, a match is said to be not found if the Proximity score is less than the Tertiary Input. Object detection is crucial to establishing the relationship between Primary Input and Secondary Input.

The System 100 includes a Keyword Detection Unit 180 that, in the case of the optional Secondary Input being a list of keywords, tries to search a given keyword in the transcript of the Primary Input based on string search. A Proximity score is generated programmatically for every keyword examined by the Keyword Detection Unit. A match is said to be found if the Proximity score is more than or equal to the Tertiary Input. A match is not found if the Proximity score is less than the Tertiary Input. Keyword relates to the words found in the Transcription of the Primary Input.

The System 100 includes an Index table generation Unit 190 generates a Secondary Output in the form of an index table. Each line item in the index table comprises an index of the Secondary Input[j], the Proximity score, a Match, the Unique address P[u,m,n], the From and To Time-stamps for each occurrence of that Secondary Input in the Primary Input and the corresponding topic. If a match is not found, it returns a "No" flag. The Primary Input for this Unit is a video file. Secondary Input comprises one or more pages of a PDF or a Word document, one or more slides in a Powerpoint presentation, or a list of keywords. In Secondary Input[j], j refers to the index of Secondary Input.

Let us consider an example to explain the working of all Units as mentioned above. Assume that the Primary Input is a video file in which a Math Professor discusses the topic of "Numbers." The Professor uses a PDF document in the video, the Secondary Input. Let us assume the PDF document contains 25 pages. In the said video file, the Professor discusses a few other sub-topics such as Integers, Whole Numbers, Rational and Irrational Numbers and uses the corresponding pages of the said PDF document during the discussion. Let us further assume that a user tries to process that video file using the present invention at a Confidence Threshold of 75% as the Tertiary Input. The Transcription Unit extracts the transcript of that video file. The Topic Extraction Unit extracts the topics based on the Transcription Unit's Output. The Hierarchy Extraction Unit generates a hierarchical representation of the above topics based on the conceptual relationship found among the topics within the context of that video file. Further, it returns the time-stamp for each topic in the hierarchy. The Mind map Generation Unit generates a Primary Output comprising a hierarchical Mind map of topics that is editable, clickable with an array of links to redirect to a topic for each occurrence of that topic in the Primary Input, a Unique address P[u,m,n], a From and To Time-stamps of that topic.

In this example, if the topic "Integer" is referred to multiple times in the video file, then an array of links are generated for each node. The array of links redirects the user to the topic "Integer" every time it is referred to in the Primary Input.

Further, the system generates a Secondary Output for the given Primary Input and the Secondary Input. For example, let us assume that one of the sub-topics, "Integer," is found on page number 25 in the Secondary Input PDF document. Suppose a user wants to refer to that portion of the video where page number 25 is used by the Professor. The Pre-processing Unit processes that PDF document to create an array of Images. The array would consist of 25 images, one image for every page of that PDF document. The Object Detection Unit compares that image of page number 25 with each frame of that video lecture. Proximity score is generated for each pair of images examined by the Object Detection Unit. A match is said to be found if the Proximity score is more than or equal to 75%, which is the Confidence Threshold. A match is not found if the Proximity score is less than 75%.

Further, the Index table generation Unit programmatically generates a Secondary Output in the form of an index table. Each line item of the table provides details of Page 25 detection in the video file, its corresponding topic in the video file, and the Unique address P[u,m,n] assigned to each node in the hierarchy, the From and To Time Stamps for each occurrence of Page 25 in the video, and the corresponding Proximity score. In P[u,m,n], u represents a unique number for each node in the system, m represents the number of its parent node, and n represents its position relative to the siblings of node m.

In the example above, if the topic "Integer" is referred to more than once in the video file by the Professor, an array of Time-stamps is generated for each occurrence of the topic "Integer" in the video file.

Further, in the above example, if a user searches for the image of John F Kennedy in that video lecture, the object detection unit does not find a match since the Proximity score is less than the Confidence Threshold of 75%. And, the Index table generation Unit programmatically returns the Secondary Output as "Not found."

Detailed Description of Method

FIG. 2 illustrates Method 300 of programmatically generating a hierarchical Mind map for a video file and representing the relationship between the contents of such video file and contents of supporting files though not limited to, such as a PDF document, a Word document, a Jpeg file, a Powerpoint presentation or a list of keywords, that may appear in that video file, in the form of an index table. The Method 300 comprises the following steps:

- The first step includes an Input step 310, as shown in FIG. 2A, for receiving a plurality of Inputs through the Input Unit. The plurality of Inputs comprises a Primary Input, an optional Secondary Input, and a Tertiary Input. According to some embodiments, a Primary Input may be a video file. According to some embodiments, Secondary Input may be one or more pages of a PDF document or a Word document, or one or more slides of a Powerpoint presentation, or one or more image files such as a Jpeg file, or a list of keywords. According to some embodiments, the Tertiary Input is the Confidence Threshold as set by the user;
- The second step includes a Transcription extraction step 320, as shown in FIG. 2B, for extracting a transcript of the Primary Input through the Transcription Unit. The Transcription is extracted using a Speech-to-text Algorithm. The Primary Input may be a video file. The transcript that is extracted is editable. This step further returns the Time-stamps of each word spoken in that video file;
- The third step includes Topic Extraction Step 330, as shown in FIG. 2C and FIG. 2C.1. In this step, a list of topics is extracted based on the Output of the previous step through the Topic Extraction Unit. It also extracts the From and To Time-stamps when the topic is spoken in the Primary Input. The extracted topics are editable;
- The fourth step includes Hierarchy Extraction step 340, as shown in FIG. 2D. This step generates a hierarchical representation of the extracted topics based on the conceptual relationship found among the topics within the context of the Primary Input. Further, it returns the time-stamp for each topic in the hierarchy;
- The fifth step includes Mind map Generation step 350, as shown in FIG. 2E. This step generates a Primary Output based on the Output of the Hierarchy Step 340 through the Mind map Generation Unit. Primary Output comprises a hierarchical Mind map of topics that is editable, clickable with an array of links to redirect to a topic for each occurrence of that topic in the Primary Input; a Unique address P[u,m,n] a From and To Time-stamps of that topic;
- The sixth step includes Pre-processing step 360, as shown in FIG. 2F. According to some embodiments, Pre-processing Unit receives a Secondary Input being a PDF document or a Word document, or one or more slides of a Powerpoint presentation, or one or more image files such as a Jpeg file. The Pre-processing Unit processes the documents, slides, and images to create an array of images and passes it to the Object Detection step. According to some embodiments, the Pre-processing Unit receives a Secondary Input, being a list of keywords. It stops processing such list of keywords any further and does not create any image for the same.
- The seventh step includes Object Detection step 370, as shown in FIG. 2G. This step receives an array of images from the Pre-processing step. It attempts to compare the Input image within each frame of the Primary Input. A Proximity score is generated programmatically for each pair of images through the Object Detection Unit. A match is said to be found if the Proximity score is more than or equal to the Tertiary Input. A match is said to be not found if the Proximity score is less than the Tertiary Input;
- The eighth step includes a Keyword matching step 380, as shown in FIG. 2H. This step receives the optional Secondary Input, being a list of keywords. This step tries to search a given keyword in the transcript of the Primary Input based on string search. A Proximity score is generated programmatically for every keyword through the Keyword Detection Unit. A match is said to be found if the Proximity score is more than or equal to the Tertiary Input. A match is said to be not found if the Proximity score is less than the Tertiary Input;
- The ninth step includes an Index table generation step 390, as shown in FIG. 3. This step generates Secondary Output in the form of an index table. Each line item in the index table comprises an index of the Secondary Input[j], the Proximity score, a Match, the Unique address P[u,m,n], the From and To Time-stamps for each occurrence of that Secondary Input in the Primary Input and the corresponding topic. If the match is not found, it returns a "No" flag.

Detailed Description of Computer-Readable Medium

FIG. 3 illustrates that the object of the invention is also achieved by a computer program product stored on a non-transitory computer-readable medium and which can be executed on one or more processors, wherein the non-transitory computer-readable medium and one or more processors are adapted to be coupled to a communication network interface. The computer program product is able, on execution, to enable the one or more processors to perform the following steps comprising:

Receiving a plurality of Inputs comprising a Primary Input, an optional Secondary Input, and a Tertiary Input, the Primary Input comprising of though not limited to, a video file, the optional Secondary Input comprising of one or more pages of a PDF document or a Word document, or one or more slides of a Powerpoint presentation, or one or more image files such as a Jpeg file, or a list of keywords, the Tertiary Input comprises of Confidence Threshold;

Extracting Transcription of the Primary Input;

Extracting a list of topics from that Transcription;

Generating hierarchical representation of the extracted topics based on the conceptual relationship found among the topics within the context of the Primary Input and returning the time-stamp for each topic in the hierarchy;

Generating programmatically a Primary Output comprising a hierarchical Mind map of topics that is editable, clickable with an array of links to redirect to a topic for each occurrence of that topic in the Primary Input;

a Unique address P[u,m,n]

a From and To Time-stamps of that topic;

Creating an array of images of contents of a Secondary Input; According to some embodiments, Pre-processing Unit receives a Secondary Input being a PDF document or a Word document, or one or more slides of a Powerpoint presentation, or one or more image files such as a Jpeg file. The Pre-processing Unit processes the documents, slides, and images to create an array of images and passes it to the Object Detection step. According to some embodiments, the Pre-processing Unit receives a Secondary Input, being a list of keywords. It stops processing such list of keywords any further and does not create any image for the same.

Receiving an array of images from the Pre-processing step. It attempts to compare the Input image with each frame of the Primary Input. A Proximity score is generated programmatically for each pair of images that are examined by the Object Detection Unit. A match is said to be found if the Proximity score is more than or equal to the Tertiary Input. A match is said to be not found if the Proximity score is less than the Tertiary Input;

Receiving the Secondary Input being a list of keywords. This step tries to search a given keyword in the transcript of the Primary Input, based on string search. The step generates a Proximity score programmatically for every keyword through the Keyword Detection Unit. A match is said to be found if the Proximity score is more than or equal to the Tertiary Input. A match is said to be not found if the Proximity score is less than the Tertiary Input;

Generating Secondary Output in the form of an index table. Each line item in the index table comprises an index of the Secondary Input[j], the Proximity score, a Match, the Unique address P[u,m,n], the From and To Time-stamps for each occurrence of that Secondary Input in the Primary Input and the corresponding topic. If the match is not found, it returns a "No" flag.

What is claimed is:

1. A method for programmatically generating a hierarchical Mind map for a video file and representing the relationship between the contents of that video file and contents of supporting files in the form of an index table, the method comprising:

Receiving a plurality of Inputs comprising a Primary Input, a Secondary Input, and a Tertiary Input; Extracting Transcription of the Primary Input;

Extracting a list of topics from that Transcription;

Generating a hierarchical representation of topics based on a conceptual relationship found in the transcripted text along with a time-stamp for each topic in the hierarchy;

Generating a Primary Output based on the Output of Hierarchy Extraction step, the Primary Output comprising:

the hierarchical Mind map of topics;

a Unique address P[u,m,n];

a From and To Time-stamps of that topic;

Creating an array of images of contents of the Secondary Input; Receiving the array of images of contents of the Secondary Input;

Searching for the Secondary Input; and Generating a Secondary Output as the index table programmatically, each line item in the Secondary Output comprising: an index of the Secondary Input;

a Proximity score;

a Match;

the Unique address P[u,m,n];

the From and To Time-stamps for each occurrence of that Secondary Input in the Primary Input; and the corresponding topic.

2. The Method of claim 1, comprising the Primary Input comprising a video file; the Secondary Input; and the Tertiary Input comprising of Confidence Threshold.

3. The Method of claim 2, further comprising: extracting the Transcription of Primary Input wherein the Transcription is editable; and extracting a list of topics from the Transcription wherein the list of topics is also editable.

4. The Method of claim 3, further comprising: generating the hierarchical representation of the list of topics based on the conceptual relationship found among the topics within the context of the Primary Input; and returning the time-stamp for each topic in the hierarchy.

5. The Method of claim 4, further comprising: programmatically generating the Primary Output based on the Output of the Hierarchy Extraction.

6. The Method of claim 1, further comprising: creating an array of images of contents of the Secondary Input.

7. The Method of claim 6, further comprising: receiving the array of images of contents of the Secondary Input; comparing the images with each frame of the Primary Input; and generating a Proximity score programmatically for each array of images, wherein a match is said to be found if the Proximity score is more than or equal to the Tertiary Input, and wherein the match is said to be not found if the Proximity score is less than the Tertiary Input.

8. The Method of claim 1, further comprising: searching for the Secondary Input; and generating the Proximity score programmatically for every keyword through a Keyword Detection Unit, wherein the match is said to be found if the Proximity score is more than or equal to the Tertiary Input, and wherein the match is said to be not found if the Proximity score is less than the Tertiary Input.

9. The Method of claim 1, further comprising: generating the Secondary Output as an index table programmatically, wherein each line item in the Secondary Output comprises: an index of the Secondary Input [j]; the Proximity score; a Match; the Unique address P[u,m,n]; the From and To Time-stamps for each occurrence of that Secondary Input in the Primary Input; and the corresponding topic, wherein if the match is not found, it returns a "No" flag.

10. A computer program stored on a non-transitory, computer-readable medium and adapted to be executed on one or more processors, wherein the non-transitory computer-readable medium and the one or more processors are adapted to be coupled to a communication network interface, and wherein the computer program on execution enables the one or more processors to perform the steps comprising:

Receiving a plurality of Inputs comprising a Primary Input, a Secondary Input, and a Tertiary Input;

Extracting Transcription of the Primary Input;

Extracting a list of topics from that Transcription;

Generating a hierarchical representation of topics based on a conceptual relationship found in a transcripted text along with a time-stamp for each topic in the hierarchy;

Generating the Primary Output based on the Output of Hierarchy Extraction step, the Primary Output comprising: a hierarchical Mind map of topics that is editable, clickable with an array of links to redirect to a topic for each occurrence of that topic in the Primary Input;

a Unique address P[u,m,n];

a From and To Time-stamps of the topic;

Creating an array of images of contents of the Secondary Input;

Receiving the array of images of contents of the Secondary Input;

comparing the Input image with each frame of the Primary Input; Generating a Proximity score programmatically;

Searching for the Secondary Input; and Generating a Secondary Output as an index table programmatically, wherein each line item in the Secondary Output comprises: an index of the Secondary Input[j];

the Proximity score;

a Match;

the Unique address P[u,m,n];

the From and To Time-stamps for each occurrence of that Secondary Input in the Primary Input; and the corresponding topic, wherein if the match is not found, it returns a "No" flag.

11. The computer program of claim 10, wherein the Primary Input is a video file, and wherein the Tertiary Input comprises a Confidence Threshold.

12. The computer program of claim 10, wherein the Transcription extracted from the Primary Input is editable, and wherein the topics extracted from the Output are editable.

* * * * *